(12) United States Patent
Zhao et al.

(10) Patent No.: US 12,478,709 B2
(45) Date of Patent: Nov. 25, 2025

(54) MEDICAL HYDROGEL AND PREPARATION METHOD AND USES THEREOF

(71) Applicant: Beijing Biosis Healing Biological Technology Co., Ltd., Beijing (CN)

(72) Inventors: Bo Zhao, Beijing (CN); Pengfei Wei, Beijing (CN); Wei Zhao, Beijing (CN); Wei Jing, Beijing (CN); Leilei Xia, Beijing (CN); Yanrui Zhao, Beijing (CN)

(73) Assignee: Beijing Biosis Healing Biological Technology Co., Ltd., Beijing (CN)

( * ) Notice: Subject to any disclaimer, the term of this patent is extended or adjusted under 35 U.S.C. 154(b) by 514 days.

(21) Appl. No.: 18/014,385

(22) PCT Filed: Jun. 10, 2021

(86) PCT No.: PCT/CN2021/099446
§ 371 (c)(1),
(2) Date: Jan. 4, 2023

(87) PCT Pub. No.: WO2022/217733
PCT Pub. Date: Oct. 20, 2022

(65) Prior Publication Data
US 2023/0256134 A1    Aug. 17, 2023

(30) Foreign Application Priority Data
Apr. 14, 2021  (CN) .......... 202110402493.1

(51) Int. Cl.
 *A61L 24/00*   (2006.01)
 *A61L 24/04*   (2006.01)
(52) U.S. Cl.
 CPC ....... *A61L 24/0031* (2013.01); *A61L 24/0015* (2013.01); *A61L 24/046* (2013.01); *A61L 2300/232* (2013.01); *A61L 2430/36* (2013.01)

(58) Field of Classification Search
 CPC .. A61L 24/031; A61L 2400/06; A61L 24/043; A61L 27/52; C08L 71/02
 See application file for complete search history.

(56) References Cited

U.S. PATENT DOCUMENTS

2005/0281883 A1    12/2005   Daniloff et al.

FOREIGN PATENT DOCUMENTS

| CN | 102911493 A | 2/2013 |
|----|-------------|--------|
| CN | 103459542   | * 12/2013 |

(Continued)

OTHER PUBLICATIONS

Yazhong Bu et al.; Tetra-PEG Based Hydrogel Sealants for In Vivo Visceral Hemostasis, *Advanced Materials* 31, 1901580 (2019).

(Continued)

*Primary Examiner* — Carlos A Azpuru
(74) *Attorney, Agent, or Firm* — The Dobrusin Law Firm, P.C.

(57) ABSTRACT

The present disclosure pertains to the field of biomedical materials, and in particular relates to a medical hydrogel, a preparation method and uses thereof, and a kit for preparing the medical hydrogel. The medical hydrogel of the present disclosure comprises a hydrogel skeleton, and a chelating agent chelated to the hydrogel skeleton; wherein the hydrogel skeleton comprises a polymer that is formed by the bonding of a polyethylene glycol derivative I having a structure shown in Formula (I) and a polyethylene glycol derivative II having a structure shown in Formula (II) and has multiple "long arms". After tannic acid and/or citric acid as a chelating agent chelates with the hydrogel skeleton, a medical hydrogel can be obtained, which has good bacteriostatic properties, mechanical properties, adhesion properties, low swelling properties, and controllable gel formation rate and degradation rate. Moreover, the hydrogel is (Continued)

able to maintain viscosity in a wet state without being affected by body fluids, and it can still ensure effective adhesion and closure of wounds if there is movement or pulsation of the tissue, thus having great clinical application prospects.

20 Claims, 6 Drawing Sheets

(56) References Cited

FOREIGN PATENT DOCUMENTS

| | | |
|---|---|---|
| CN | 103459542 A | 12/2013 |
| CN | 104399109 A | 3/2015 |
| CN | 106519264 A | 3/2017 |
| CN | 108525002 A | 9/2018 |
| CN | 108525016 A | 9/2018 |
| CN | 110025821 A | 7/2019 |
| WO | 2012/035598 A1 | 3/2012 |

OTHER PUBLICATIONS

International Search Report and Written Opinion dated Jan. 12, 2022, for International Application PCT/CN2021/099446.

* cited by examiner

MEDICAL HYDROGEL AND PREPARATION METHOD AND USES THEREOF

TECHNICAL FIELD

The present disclosure pertains to the field of biomedical materials, and in particular relates to a medical hydrogel, a preparation method and uses thereof, and a kit for preparing the medical hydrogel.

BACKGROUND

Hydrogel is a new type of functional polymer material, which has a three-dimensional network structure with hydrophilic groups and can be swelled by water but is insoluble in water. It has characteristics such as biosafety, modifiability and favorable mechanical properties, and is widely used in biomedicine, agriculture, industry, environmental protection and other fields.

In the field of biomedicine, hydrogel can be used as a medical dressing to cover wounds and achieve rapid healing. In addition, hydrogel can also be used as a drug sustained-release carrier, a tissue engineering material, an oral application material, etc. Due to its porosity, softness, high water content, and high histocompatibility, it has a very broad application prospect in the biomedical field. Up to now, there have been a variety of hydrogel materials on the market that are used in hemostasis in clinical practice, but there are still some problems. For an excellent hydrogel material used in hemostasis and tissue sealing, it is required to have a suitable gel formation rate, high mechanical strength, low swelling and certain bacteriostatic properties. The development of a medical hydrogel with excellent comprehensive properties is an important problem that needs to be solved urgently in the current industry.

Reference Document 1 discloses a PEG hydrogel based on fast-breakable chemical bonds as well as a preparation method and applications thereof. The hydrogel is formed by connecting a polyethylene glycol derivative 1 (PEG-Amine) with a polyethylene glycol derivative 2 (polyethylene glycol succinimide ester) and a polyethylene glycol derivative 3 (PEG ALD) via a chemical bond 1 and a chemical bond 2, respectively; the chemical bond 1 is a (3-carbonyl amide bond; the chemical bond 2 is a Schiff base bond. Although PEG hydrogel has a fast gel formation rate and can be rapidly degraded both in vivo and on the body surface, the polyethylene glycol derivative 3 therein contains an aldehyde group that has potential biological toxicity. As a result, the PEG hydrogel has reduced biosafety, and it is difficult to achieve bacteriostatic properties.

Reference Document 2 discloses a double-network hydrogel based on PEG and polysaccharides as well as a preparation method and applications thereof. The chemical-physical/chemical double-network hydrogel is formed under the hydrogen bond interaction between a first chemical network and a second physical/chemical network; the first chemical network is formed by a chemical reaction of a polyethylene glycol derivative 1 and a polyethylene glycol derivative 2; the second physical/chemical network is formed by either 1) or 2) as follows: 1) crosslinking of a polysaccharide or derivatives thereof, 2) interaction between a polysaccharide or derivatives thereof and a crosslinking agent. Although the double-network hydrogel prepared by this method has self-recovery ability and favorable biocompatibility, its mechanical properties and bacteriostatic properties still need to be further improved.

Reference Document 3 discloses an injectable biological glue having high-strength adhesion properties and a preparation method and applications thereof. The injectable biological glue is formed by the hydrogen bonding interaction between a polyethylene glycol derivative (polyethylene glycol succinimide ester) and tannic acid. The preparation method of the injectable biological glue comprises steps of: (1) preparing a solution 1 of the polyethylene glycol derivative; (2) preparing a solution 2 of tannic acid; and (3) mixing the solution 1 and the solution 2, followed by centrifugation, to obtain a precipitation. The injectable biological glue formed by the physical interaction (hydrogen bonding) of two substances, PEG derivative and tannic acid, has advantages of convenient use and high adhesion. However, the mechanical properties of such injectable biological glue are insufficient; and tannic acid interacts with the PEG derivative through hydrogen bonding, resulting in problems of rapid degradation and short service life, which affects its wound repair performance, and makes it difficult to apply to adhesion of narrow and deep wounds.

REFERENCE DOCUMENTS

Reference Document 1: CN108525016A
Reference Document 2: CN106519264A
Reference Document 3: CN108525002A

SUMMARY

Technical Problem

In view of the problems existing in the prior art, for example, medical hydrogels cannot combine good mechanical properties, bacteriostatic properties and biocompatibility, and have problems of uncontrollable gel formation time, rapid degradation and short service life. Therefore, the present disclosure provides a medical hydrogel, which is obtained by reacting a specific chelating agent with a polyethylene glycol derivative I and a polyethylene glycol derivative II. The medical hydrogel has excellent mechanical properties and good biocompatibility, can maintain viscosity especially in a humid environment, and can maintain elasticity after adhering to a tissue surface; it has adjustable degradation rate and has good bacteriostatic properties, is suitable for postoperative hemostasis, tissue repair, wound sealing, especially for wound sealing and hemostasis for soft tissues, so it has important clinical significance and great application potential.

Solution to Problem

The present disclosure provides a medical hydrogel comprising a hydrogel skeleton and a chelating agent chelated to the hydrogel skeleton;

the hydrogel skeleton is formed by the bonding of a polyethylene glycol derivative I and a polyethylene glycol derivative II, and the structure of the polyethylene glycol derivative I is shown in Formula (I):

(I)

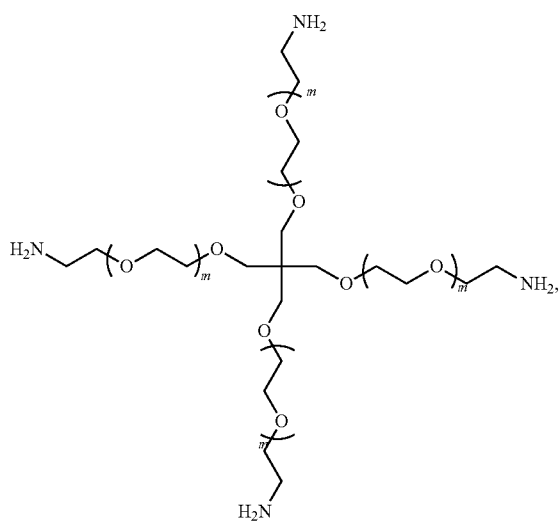

the structure of the polyethylene glycol derivative II is shown in Formula (II):

(II)

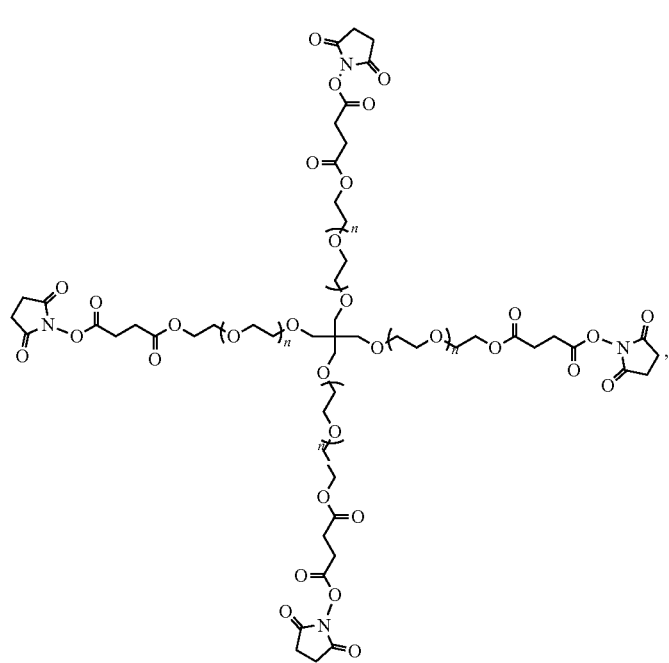

wherein, m and n are natural numbers; the molecular weight of the polyethylene glycol derivative I is 2000 to 20000, preferably 5000 to 15000, and more preferably 8000 to 12000; the molecular weight of the polyethylene glycol derivative II is 2000 to 20000, preferably 5000 to 15000, and more preferably 8000 to 12000;

the chelating agent is selected from tannic acid and/or citric acid.

In some embodiments, m is a natural number such that the molecular weight of the polyethylene glycol derivative I is 2000 to 20000, preferably 5000 to 15000, and more preferably 8000 to 12000.

In some embodiments, n is a natural number such that the molecular weight of the polyethylene glycol derivative II is 2000 to 20000, preferably 5000 to 15000, and more preferably 8000 to 12000.

In some embodiments, according to the medical hydrogel of the present disclosure, the mass ratio of the polyethylene glycol derivative I and the polyethylene glycol derivative II is 1:(0.8 to 1.2), preferably 1:(0.9 to 1.1), and more preferably 1:(0.95 to 1.05).

In some embodiments, according to the medical hydrogel of the present disclosure, the mass ratio of the polyethylene glycol derivative I and the chelating agent is 1:(0.003 to 0.03), and preferably 1:(0.01 to 0.02).

In some embodiments, according to the medical hydrogel of the present disclosure, the chelating agent is tannic acid.

The present disclosure also provides a preparation method of the medical hydrogel according to the present disclosure, and the preparation method comprises steps of:

preparing a solution A containing a polyethylene glycol derivative I and a chelating agent;

preparing a solution B containing a polyethylene glycol derivative II;

mixing the solution A and the solution B to obtain a medical hydrogel.

In some embodiments, according to the preparation method of the present disclosure, the step of preparing the solution A containing a polyethylene glycol derivative I and a chelating agent comprises:

preparing a solution containing a polyethylene glycol derivative I and a solution containing a chelating agent, respectively, and mixing the two solutions to obtain the solution A; or, preparing a solution containing a polyethylene glycol derivative I, and adding a chelating agent to the solution containing the polyethylene glycol derivative I to obtain the solution A; or, preparing a solution containing a chelating agent, and adding a polyethylene glycol derivative I to the solution containing the chelating agent to obtain the solution A; or, mixing a polyethylene glycol derivative I and a chelating agent and adding the mixture to a solvent to obtain the solution A.

In some embodiments, according to the preparation method of the present disclosure, the chelating agent is tannic acid. Preferably, the mass concentration percentage of tannic acid in the solution A is 0.06% to 0.6% (m/v), preferably 0.1% to 0.5% (m/v), more preferably 0.2% to 0.4% (m/v), and further preferably 0.3% (m/v).

In some embodiments, according to the preparation method of the present disclosure, the mass concentration percentage of the polyethylene glycol derivative I in the solution A is 10% to 25% (m/v), and preferably 18% to 22% (m/v).

In some embodiments, according to the preparation method of the present disclosure, the mass concentration percentage of the polyethylene glycol derivative II in the solution B is 10% to 25% (m/v), and preferably 18% to 22% (m/v).

The present disclosure further provides uses of the medical hydrogel according to the present disclosure or the medical hydrogel obtained by the preparation method according to the present disclosure, in at least one of the following (a)-(d):

(a) using as or preparing a medical hydrogel for endoscopic sealing;
(b) using as or preparing a medical hydrogel for blood vessel sealing;
(c) using as or preparing a medical hydrogel for surgical sealing;
(d) using as or preparing a medical hydrogel for sealing cerebrospinal fluid leakage.

The present disclosure further provides a kit for preparing a medical hydrogel, the kit comprising:

a component E, comprising a polyethylene glycol derivative I having a structure shown in Formula (I):

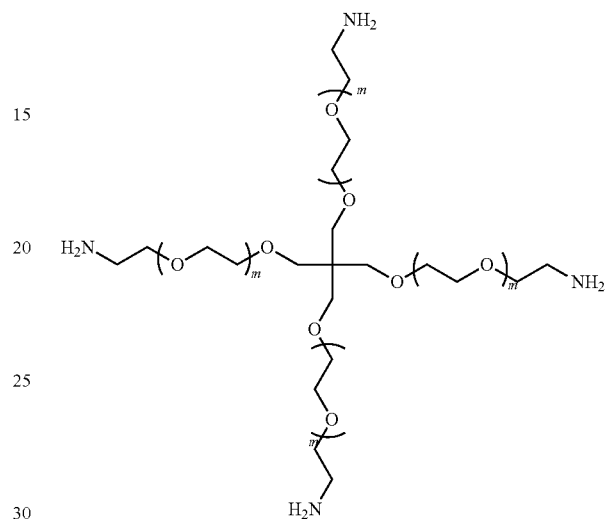

(I)

a component F, comprising a polyethylene glycol derivative II having a structure shown in Formula (II):

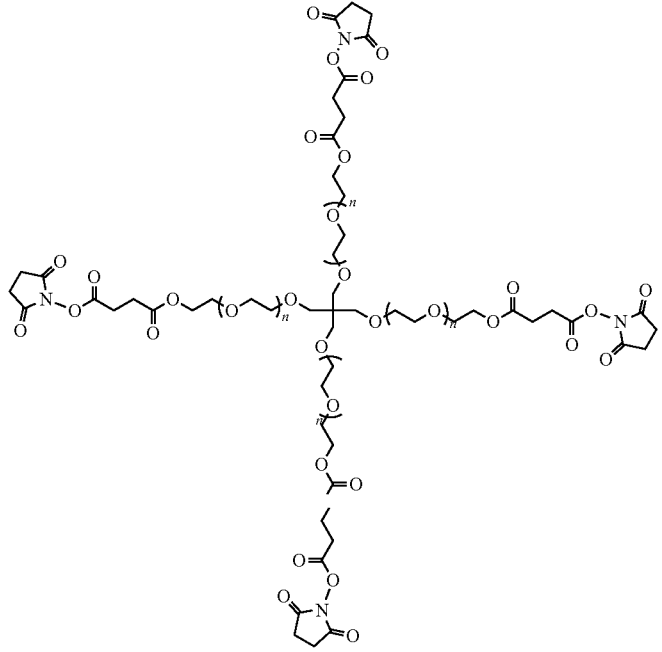

(II)

and, a component G, comprising a chelating agent;

wherein, m and n are natural numbers; the molecular weight of the polyethylene glycol derivative I is 2000 to 20000, preferably 5000 to 15000, and more preferably 8000 to 12000; the molecular weight of the polyethylene glycol derivative II is 2000 to 20000, preferably 5000 to 15000, and more preferably 8000 to 12000;

the chelating agent is selected from tannic acid and/or citric acid.

Effects

In some embodiments, the medical hydrogel provided by the present disclosure comprises a hydrogel skeleton and a chelating agent chelated to the hydrogel skeleton. The hydrogel skeleton therein comprises a polymer that is formed by the bonding of a polyethylene glycol derivative I having a structure shown in Formula (I) and a polyethylene glycol derivative II having a structure shown in Formula (II) and has multiple "long arms". After tannic acid and/or citric acid as a chelating agent chelates to the hydrogel skeleton, a medical hydrogel can be obtained, which has good bacteriostatic properties, mechanical properties, adhesion properties, low swelling properties, and controllable gel formation rate and degradation rate.

In some embodiments, the medical hydrogel provided by the present disclosure has tannic acid as the chelating agent, which mutually chelates with the functional groups of the hydrogel skeleton, so that the medical hydrogel has high mechanical strength, burst strength, and excellent bacteriostatic properties. After the addition of tannic acid, it is possible to achieve swelling control of the medical hydrogel and effectively adjust the gel formation time and degradation time, so as to meet various biomedical needs such as postoperative hemostasis, wound sealing, and tissue adhesion. Besides, the hydrogel is able to maintain viscosity in a wet state without being affected by body fluids; it has elasticity, to ensure effective adhesion and closure of wounds if there is movement or pulsation of the tissue, thus having great clinical application prospects.

In some embodiments, the preparation method provided by the present disclosure has simple steps, easy operation, low cost and abundant sources of the preparation of raw materials, and is suitable for large-scale industrial mass production.

BRIEF DESCRIPTION OF THE DRAWINGS

In FIG. 1, "a" indicates that the mass concentration percentage of tannic acid in solution A is 0% (m/v), "b" indicates that the mass concentration percentage of tannic acid in solution A is 0.1% (m/v), "c" indicates that the mass concentration percentage of tannic acid in solution A is 0.3% (m/v), "d" indicates that the mass concentration percentage of tannic acid in solution A is 0.5% (m/v), and "e" indicates that the mass concentration percentage of tannic acid in solution A is 1% (m/v).

In FIG. 3, "a" to "e" sequentially indicate that the mass concentration percentage of tannic acid in solution A is 0% (m/v), 0.1% (m/v), 0.3% (m/v), 0.5% (m/v), and 1% (m/v), respectively.

In FIG. 4, "a" to "e" sequentially indicate that the mass concentration percentage of tannic acid in solution A is 0% (m/v), 0.1% (m/v), 0.3% (m/v), 0.5% (m/v), and 1% (m/v), respectively.

In FIG. 7, "a" to "e" sequentially indicate that the mass concentration percentage of tannic acid in solution A is 0% (m/v), 0.1% (m/v), 0.3% (m/v), 0.5% (m/v), and 1% (m/v), respectively.

In FIG. 8, "a" to "e" sequentially indicate that the mass concentration percentage of tannic acid in solution A is 0% (m/v), 0.1% (m/v), 0.3% (m/v), 0.5% (m/v), and 1% (m/v), respectively.

In FIG. 9, "a" to "e" sequentially indicate that the mass concentration percentage of tannic acid in solution A is 0% (m/v), 0.1% (m/v), 0.3% (m/v), 0.5% (m/v), and 1% (m/v), respectively.

In FIG. 10, "a" to "e" sequentially indicate that the mass concentration percentage of tannic acid in solution A is 0% (m/v), 0.1% (m/v), 0.3% (m/v), 0.5% (m/v), and 1% (m/v), respectively.

DETAILED DESCRIPTION

Figure 1:
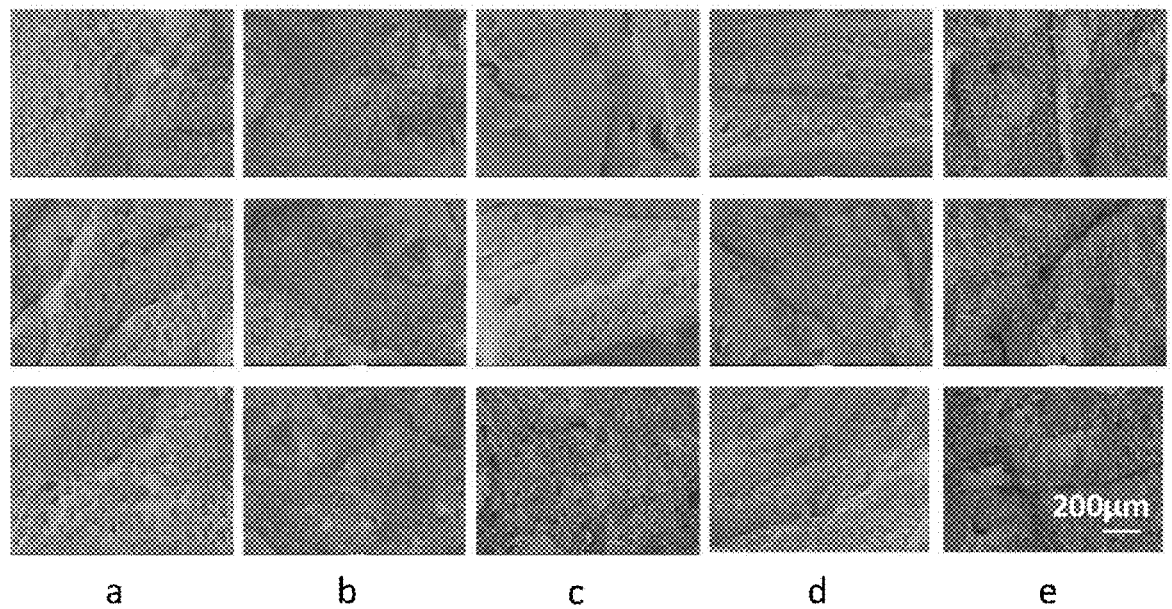
FIG. 1 shows SEM images of medical hydrogels with different content of tannic acid.

Various exemplary embodiments, features and aspects of the present disclosure will be described in detail below. The word "exemplary" is used exclusively herein to mean "serving as an example, embodiment, or being illustrative". Any "exemplary" embodiment described herein is not necessarily to be construed as preferable or advantageous over other embodiments.

In addition, in order to better illustrate the present disclosure, numerous specific details are given in the following detailed description. It will be understood by those skilled in the art that the present disclosure can be implemented without certain specific details. In some other embodiments, methods, means, devices and steps known to those skilled in the art are not described in detail so as to highlight the subject matter of the present disclosure.

Unless otherwise stated, the units used in this specification are all international standard units, and the numerical values and numerical ranges appearing in the present disclosure should be understood as including systematic errors unavoidable in industrial production.

In this specification, unless otherwise specified, "% (m/v)" refers to the percentage of mass concentration. The mass concentration percentage refers to the mass of a certain component in a unit volume of solvent. In this specification, the mass concentration percentage is calculated in "mL" as a volume unit and in "g" as a mass unit. Exemplarily, if 0.003 g of a substance component is added to 1 mL of a solvent, the mass concentration percentage of the substance component is (0.003 g/1 mL)*100%=0.3% (m/v).

In this specification, unless otherwise specified, the "molecular weight" of the polyethylene glycol derivatives means the weight average molecular weight of the polyethylene glycol derivatives.

In this specification, the meaning expressed by "can" includes both the meaning of performing a certain processing and the meaning of not performing a certain processing.

In this specification, "some specific/preferable embodiment", "other specific/preferable embodiment", "embodiment", etc. refer to specific elements (e.g., features, structures, properties, and/or characteristics) described in connection with the embodiment are included in at least one embodiment described herein, and may or may not be present in other embodiments. Further, it should be understood that the described elements can be combined in any suitable manner in various embodiments.

In this specification, the range of values represented by the use of "value A to value B" refers to a range including endpoint values A and B.

In addition, in this specification, "water" includes deionized water, distilled water, ion-exchanged water, double-distilled water, high-purity water, purified water, and any feasible water that can be used.

In this specification, when "normal temperature" or "room temperature" is used, the temperature can be 10 to 40° C.

Medical Hydrogel

The first aspect of the present disclosure provides a medical hydrogel, comprising a hydrogel skeleton, and a chelating agent chelated to the hydrogel skeleton;

the hydrogel skeleton is formed by the bonding of a polyethylene glycol derivative I and a polyethylene glycol derivative II, the structure of the polyethylene glycol derivative I is shown in Formula (I):

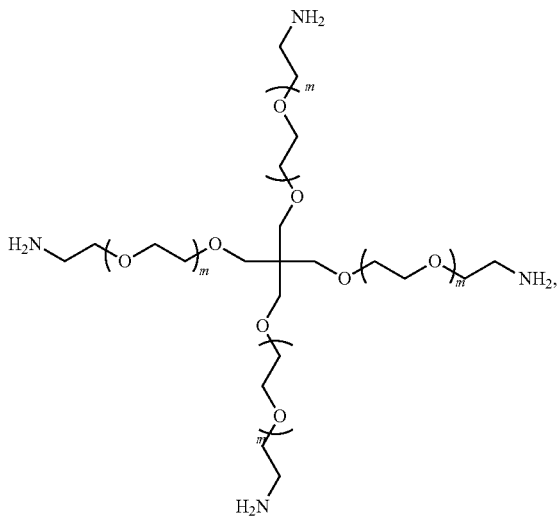

the structure of the polyethylene glycol derivative II is shown in Formula (II):

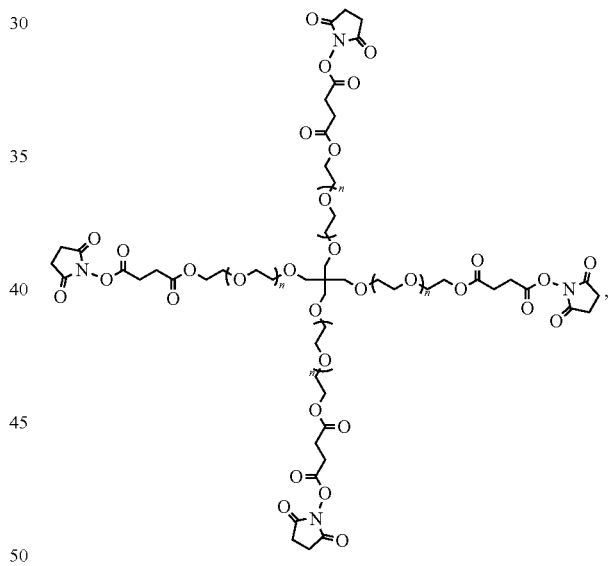

and a chelating agent;

wherein, m and n are natural numbers; the molecular weight of the polyethylene glycol derivative I is 2000 to 20000, preferably 5000 to 15000, and more preferably 8000 to 12000; the molecular weight of the polyethylene glycol derivative II is 2000 to 20000, preferably 5000 to 15000, and more preferably 8000 to 12000.

In the present disclosure, two kinds of PEG derivatives, i.e., a polyethylene glycol derivative I shown in Formula (I) (4-arm Poly(ethylene glycol) amine, abbreviated as: 4arm-PEG-NH$_2$), and a polyethylene glycol derivative II shown in Formula (II) (4-arm Poly(ethylene glycol) succinimidyl succinate, abbreviated as: 4arm-PEG-SS), are selected to bond to form a hydrogel skeleton; at least one of tannic acid and citric acid is used as a chelating agent to chelate with the hydrogel skeleton through hydrogen bonds.

The bonding of 4arm-PEG-$NH_2$ and 4arm-PEG-SS can form a multi-armed polymer with a three-dimensional spatial structure, which acts as a hydrogel skeleton. Tannic acid or citric acid is used to chelate with the hydrogel skeleton, which makes it possible to obtain a medical hydrogel with good bacteriostatic properties, mechanical properties, adhesion properties, low swelling properties, and controllable gel formation rate and degradation rate. By the co-bonding reaction between functional groups in the hydrogel skeleton and a tissue, the medical hydrogel can instantly form adhesive properties, to meet various biomedical needs such as postoperative hemostasis, wound sealing, and tissue adhesion, etc.

In some preferable embodiment, the chelating agent is tannic acid, which has excellent antibacterial properties, making the antibacterial properties of the medical hydrogel greatly enhanced. Further, it is found by the present disclosure that after tannic acid is chelated with the hydrogel skeleton formed by the two PEG derivatives, 4arm-PEG-$NH_2$ and 4arm-PEG-SS, a medical hydrogel with significantly improved stability and mechanical properties can be obtained. Moreover, after the addition of tannic acid, the swelling rate of the medical hydrogel decreases, indicating that tannic acid can be effectively embedded in the two PEG derivatives and play a role of restraining swelling. The medical hydrogel can achieve gel formation within 20s, with fast gel formation and prolonged degradation time.

In some embodiments, the medical hydrogel is formed at the tissue wound, the side of the medical hydrogel in contact with the tissue is a contact surface, and the side not in contact with the tissue is a free surface. The contact surface of the medical hydrogel formed at the wound has high viscosity, while the free surface that does not contact the tissue is not viscous. The medical hydrogel covering the wound surface can effectively adhere to the surface of the tissue and give full play to its effect of hemostasis and wound closure. The functional groups of tannic acid and the hydrogel skeleton chelate with each other, which can improve the adhesion strength of the medical hydrogel, and make it has a certain viscoelasticity, mechanical properties matching with the tissue, with no exothermic reaction, and good biocompatibility, and further have advantages of low cost and ease of mass production. And, the addition of tannic acid can also prevent 4arm-PEG-$NH_2$ and 4arm-PEG-SS from excessive fast reaction thus forming a gel structure before contacting the tissue, which makes it not effectively adhered to the tissue wound.

In some embodiments, the medical hydrogel is formed in an environment that is not in contact with a tissue. The medical hydrogel does not directly adhere to the tissue, but can act as a tissue engineering scaffold for tissue repair, for example, meniscus repair, by virtue of its high mechanical properties and good biocompatibility.

In some embodiments, for 4arm-PEG-$NH_2$ of the structure shown in Formula (I), the molecular weight of 4arm-PEG-$NH_2$ is, for example, 2000 to 20000, preferably 5000 to 15000, and more preferably 8000 to 12000; for example, 2000, 5000, 8000, 10000, 15000 or 20000. In the present disclosure, the value of m is not specifically limited, as long as the value of m is taken in such a way that the molecular weight of 4arm-PEG-$NH_2$ falls within a range of 2000 to 20000, for example, the value of m is 10 to 111. More specifically, in the present disclosure, the molecular weight of 4arm-PEG-$NH_2$ is 2000 to 20000, meaning that the weight average molecular weight of 4arm-PEG-$NH_2$ is 2000 to 20000, and the value of m in the structure shown in Formula (I) can be taken as long as the weight average molecular weight of 4arm-PEG-$NH_2$ falls within the range of 2000 to 20000.

In some embodiments, for 4arm-PEG-SS of the structure shown in Formula (II), the molecular weight of 4arm-PEG-SS is 2000 to 20000, preferably 5000 to 15000, and more preferably 8000 to 12000; for example 2000, 5000, 8000, 10000, 15000 or 20000. In the present disclosure, the value of n is not specifically limited, as long as the value of n is taken in such a way that the molecular weight of 4arm-PEG-SS falls within a range of 2000-20000, for example, the value of n is 5 to 107. More specifically, in the present disclosure, the molecular weight of 4arm-PEG-SS is 2000 to 20000, meaning that the weight average molecular weight of 4arm-PEG-SS is 2000 to 20000, and the value of n in the structure shown in Formula (II) can be taken as long as the weight average molecular weight of 4arm-PEG-SS falls within the range of 2000 to 20000.

The weight average molecular weight described in the present disclosure can be determined by methods commonly used in the art, for example, an MALDI-TOF determination method.

By adjusting the molecular weights of the two PEG derivatives, the degradation rate of the medical hydrogel can be adjusted to meet the requirements of degradation and clearance in different tissue sites, and to avoid inflammatory reactions caused by prolonged retention in the body.

In some embodiments, in order to obtain a medical hydrogel with good mechanical properties, the mass ratio of the polyethylene glycol derivative I and the polyethylene glycol derivative II is 1:(0.8 to 1.2), preferably 1:(0.9 to 1.1), and more preferably 1:(0.95 to 1.05). Exemplarily, the mass ratio of the polyethylene glycol derivative I and the polyethylene glycol derivative II is 1:0.8, 1:0.9, 1:1, 1:1.1 or 1:1.2, etc.

In some embodiments, the mass ratio of the polyethylene glycol derivative I and the chelating agent is 1:(0.003 to 0.03), and preferably 1:(0.01 to 0.02). Exemplarily, the mass ratio of the polyethylene glycol derivative I and the chelating agent is 1:0.005, 1:0.007, 1:0.009, 1:0.011, 1:0.013, 1:0.015, 1:0.017, 1:0.019, 1:0.021, 1:0.023, 1:0.025 or 1:0.027, etc. Further, the chelating agent is tannic acid, and by adjusting the content of tannic acid, the gel formation rate, degradation rate and swelling property of the medical hydrogel can be adjusted. Moreover, the medical hydrogel has high mechanical strength, good biocompatibility, high adhesion strength, and good bacteriostatic properties, suitable for wound sealing and tissue adhesion. When the mass ratio of tannic acid to 4arm-PEG-$NH_2$ is too low, for example, lower than 0.003:1, the gel formation rate and degradation rate of the medical hydrogel are too fast, resulting in adverse effects. Firstly, the reactants forming the medical hydrogel have completed the reaction before completely covering the wound surface, which is not conducive to adequate protection for the wound surface; secondly, it is not conducive to providing continuous protection during the recovery period of the wound surface. When the mass ratio of tannic acid to 4arm-PEG-$NH_2$ is too high, for example, higher than 0.03:1, the gel formation rate and degradation rate of the medical hydrogel are too slow, which is not conducive to the recovery of patients. Acting as a chelating agent, tannic acid is released during the degradation process, and is able to produce a bacteriostatic effect.

The medical hydrogel in the present disclosure has a hydrogel skeleton that is formed by a nucleophilic substitution reaction between the polyethylene glycol derivative II and the polyethylene glycol derivative I and has a structure having multiple "long arms". The hydrogel skeleton comprises a structure shown in Formula (III), wherein the structure shown in Formula (III) shows one of the reaction sites of the nucleophilic substitution reaction between the polyethylene glycol derivative II and the polyethylene glycol derivative I. The polyethylene glycol derivative II and the polyethylene glycol derivative I bond with each other through multiple sites to form a network-like three-dimensional spatial structure. The chelating agent strengthens the hydrogel skeleton by interacting with the "long arms" on the hydrogel skeleton. The chelating agent can be tannic acid and/or citric acid. When the medical hydrogel is formed on the surface of a tissue, a side chain from 4arm-PEG-SS can react with the amino groups in the tissue and exert the adhesion effect of the medical hydrogel to the tissue.

Where no chelating agent is used, although a hydrogel can be formed, there are still some problems. On the one hand, the reaction rate is too fast to effectively protect the wound surface; on the other hand, due to the weak stability and short degradation time of the reactants, it is degraded before the recovery of the wound, which makes it difficult to effectively protect the wound.

preparing a solution A containing a polyethylene glycol derivative I and a chelating agent;
preparing a solution B containing a polyethylene glycol derivative II;
mixing the solution A and the solution B to obtain a medical hydrogel.

In some embodiments, the solution A and the solution B are mixed directly on the tissue wound, so that the wound can be directly adhered and closed. The polyethylene glycol derivative I and the polyethylene glycol derivative II form a hydrogel skeleton, and a chelating agent undergoes a chelating reaction, so that the formed hydrogel has high strength, effectively protecting the wound surface, and not decreasing the viscosity due to the secretion of tissue fluid from the wound surface. As the wound recovers, the hydrogel gradually degrades, and the addition of the chelating agent can provide a bacteriostatic effect.

In some embodiments, the solution A and the solution B are mixed in an environment that is not in contact with a tissue, for example, the solution A and the solution B are mixed in a mold. The chelating agent undergoes a chelating reaction with the reactants of the polyethylene glycol deriva-

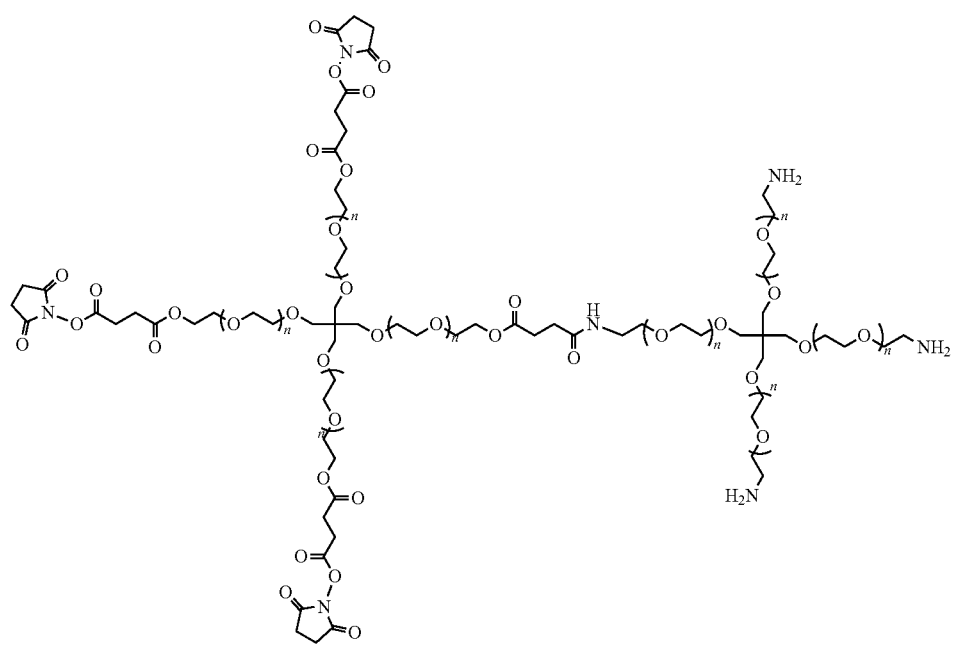

(III)

tive I and the polyethylene glycol derivative II to obtain a medical hydrogel with good mechanical properties, histocompatibility and without adhesion properties.

For the solution A, one of the following preparation methods can be selected.

In some embodiments, a solution containing the polyethylene glycol derivative I and a solution containing the chelating agent are prepared separately, and the two solutions are mixed to obtain the solution A.

In some embodiments, a solution containing the polyethylene glycol derivative I is prepared, and the chelating agent is added to the solution containing the polyethylene glycol derivative I, to obtain the solution A.

In some embodiments, a solution containing the chelating agent is prepared, and the polyethylene glycol derivative I is added to the solution containing the chelating agent.

In contrast, after a chelating agent is added, the chelating agent chelates with the multiple arms of the polyethylene glycol derivatives in the hydrogel skeleton, which improves the overall strength of the skeleton. Meanwhile, the use of the chelating agent not only slows down the degradation of the hydrogel, but also inhibits the reaction of 4arm-PEG-SS and 4arm-PEG-NH$_2$ at the initial stage of the reaction and reduces the reaction rate, thus is conducive to the formation of the hydrogel at the wound surface and ensures that the side chains in 4arm-PEG-SS react with amino groups in the tissue, providing higher viscosity to biological tissues. During the process of degradation of the hydrogel, tannic acid is released, and is able to produce a bacteriostatic effect.

Preparation Method of Medical Hydrogel

A second aspect of the present disclosure provides a preparation method of the medical hydrogel as described in the first aspect, comprising steps of:

In some embodiments, the polyethylene glycol derivative I and the chelating agent are mixed and then added to a solvent, to obtain the solution A.

For the solution containing the polyethylene glycol derivative I, it can be obtained by dissolving the polyethylene glycol derivative I in a solvent; for the solution containing the chelating agent, it can be obtained by dissolving the chelating agent in a solvent.

For the solvent, it can be PBS buffer, water or other kinds of solvents available in the art, which is not specifically limited in the present disclosure.

In some embodiments, tannic acid can be selected as the chelating agent. In some more specific embodiments, the chelating agent is mixed with the polyethylene glycol derivative I and then dissolved in PBS buffer to obtain the solution A. Alternatively, the polyethylene glycol derivative I is first dissolved in PBS buffer, and then tannic acid is added therein to obtain the solution A. Alternatively, tannic acid is first dissolved in PBS buffer and then the polyethylene glycol derivative I is added therein to obtain the solution A. Alternatively, tannic acid and the polyethylene glycol derivative I are dissolved in PBS buffer, respectively, and then the two solutions are mixed, to obtain the solution A.

In some embodiments, the mass concentration percentage of tannic acid in solution A is 0.06% to 0.6% (m/v), preferably 0.1% to 0.5% (m/v), more preferably 0.2% to 0.4% (m/v), and further preferably 0.3% (m/v). Exemplarily, the mass concentration percentage of tannic acid in solution A is 0.07% (m/v), 0.08% (m/v), 0.1% (m/v), 0.15% (m/v), 0.2% (m/v), 0.25% (m/v), 0.3% (m/v), 0.35% (m/v) or 0.4% (m/v), etc.

In some embodiments, the mass concentration percentage of the polyethylene glycol derivative I in solution A is 10% to 25% (m/v), and preferably 18% to 22% (m/v). Exemplarily, the mass concentration percentage of the polyethylene glycol derivative I in solution A is 12% (m/v), 14% (m/v), 16% (m/v), 18% (m/v), 20% (m/v), 22% (m/v) or 24% (m/v), etc.

For solution B, it is obtained by dissolving the polyethylene glycol derivative II in a solvent. The solvent can be PBS buffer, water, or other kinds of solvents available in the art, which is not specifically limited in the present disclosure. In some embodiments, the solution B is obtained by dissolving 4arm-PEG-SS in PBS buffer.

In some embodiments, the mass concentration percentage of the polyethylene glycol derivative II in solution B is 10% to 25% (m/v), and preferably 18% to 22% (m/v). Exemplarily, the mass concentration percentage of the polyethylene glycol derivative II in solution B is 12% (m/v), 14% (m/v), 16% (m/v), 18% (m/v), 20% (m/v), 22% (m/v) or 24% (m/v), etc.

By adjusting the content of the polyethylene glycol derivative I and the polyethylene glycol derivative II, the ratio between such two PEG derivatives in the formed hydrogel skeleton can be controlled, thereby improving the mechanical properties of the hydrogel skeleton. By adjusting the content of tannic acid added, the gel formation rate, degradation rate, and swelling property of the medical hydrogel can be further adjusted to form a medical hydrogel with high mechanical strength, good biocompatibility, high adhesion strength, and good bacteriostatic properties, suitable for wound sealing and tissue adhesion.

In some embodiments, the solution A and the solution B are mixed using a dual syringe. Specifically, the solution A and the solution B are respectively sucked into two pipelines of the dual syringe, and then pushed out by injection, so that the solution A and the solution B from the two pipelines are mixed in an area for reaction, and after the reaction is completed, a medical hydrogel is obtained.

Preparation Kit for Medical Hydrogel

A third aspect of the present disclosure provides a kit for preparing the medical hydrogel as described in the first aspect, comprising:

a component E, comprising a polyethylene glycol derivative I having a structure shown in Formula (I):

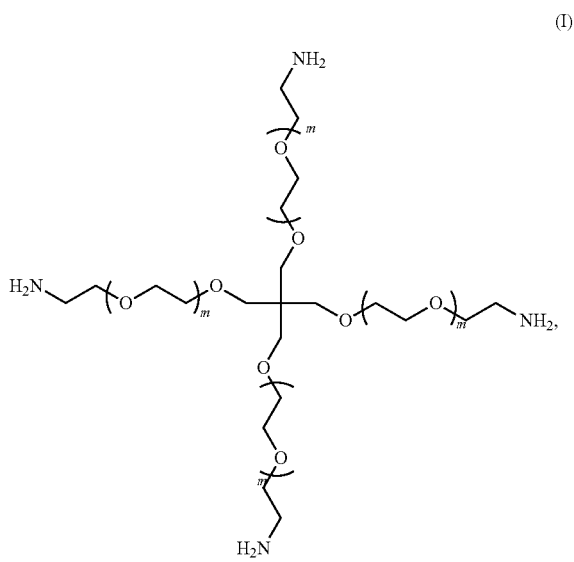

a component F, comprising a polyethylene glycol derivative I having a structure shown in Formula (II):

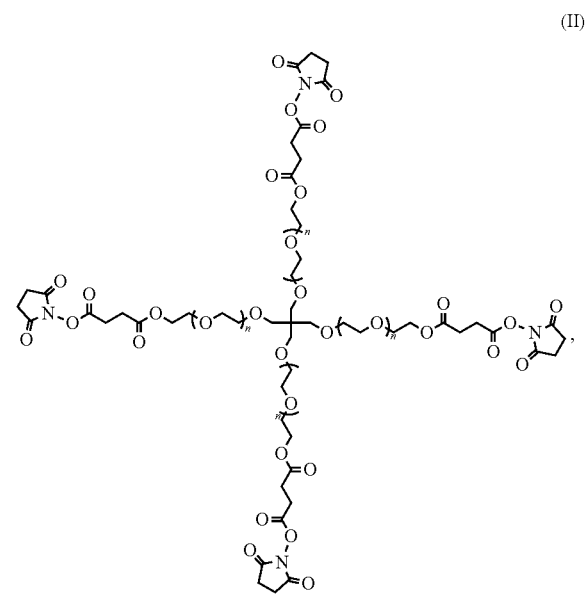

and, a component G comprising a chelating agent;

wherein, m and n are natural numbers; the molecular weight of the polyethylene glycol derivative I is 2000 to 20000, preferably 5000 to 15000, and more preferably 8000 to 12000; the molecular weight of the polyethylene glycol derivative II is 2000 to 20000, preferably 5000 to 15000, and more preferably 8000 to 12000;

the chelating agent is selected from tannic acid and/or citric acid.

By using the three components E, F, and G, the preparation kit of the present disclosure can realize rapid preparation of a medical hydrogel, and obtain a medical hydrogel with good bacteriostatic properties, mechanical properties, adhesion properties, low swelling properties, and controllable gel formation rate and degradation rate. The use of components E, F, and G in the preparation of a medical hydrogel at a tissue wound can instantly form adhesion properties, meeting various biomedical needs such as postoperative hemostasis, wound sealing, and tissue adhesion. The use of components E, F, and G to prepare a medical hydrogel in an environment that is not in contact with a tissue can form a tissue engineering scaffold with good mechanical properties, high biocompatibility, and controllable degradation rate, for tissue repair.

In some embodiments, the component E is a solid reagent. For example, the component E is a dry powder of a polyethylene glycol derivative I. In some embodiments, the component E is a liquid reagent. For example, the component E is obtained by dissolving a polyethylene glycol derivative I in a solvent. For the solvent for dissolving the polyethylene glycol derivative I, it can be PBS buffer, or any type of solvent available in the art.

In some embodiments, the component F is a solid reagent. For example, the component E is a dry powder of a polyethylene glycol derivative II. In some embodiments, the component F is a liquid reagent. For example, the component F is obtained by dissolving a polyethylene glycol derivative II in a solvent. For the solvent for dissolving the polyethylene glycol derivative II, it can be PBS buffer, or any type of solvent available in the art.

In some embodiments, the component G is a solid reagent. For example, the component G is a dry powder of tannic acid and/or citric acid. In some embodiments, the component G is a liquid reagent. For example, the component G is obtained by dissolving tannic acid and/or citric acid in a solvent. For the solvent for dissolving the chelating agent, it can be a PBS buffer, or any type of solvent available in the art. In some specific embodiment, the chelating agent is tannic acid, and the component G is a solid or liquid reagent containing tannic acid.

In some embodiments, the component E and the component G in the kit may also exist in the form of a mixed reagent, for example, a mixed dry powder of a polyethylene glycol derivative I and tannic acid, or a mixed solution with both a polyethylene glycol derivative I and tannic acid dissolved therein.

In some embodiments, the kit further includes instructions for use providing the following contents:
(1) The mass ratio of a polyethylene glycol derivative I and a polyethylene glycol derivative II for preparing a medical hydrogel using the kit is 1:(0.8 to 1.2), preferably 1:(0.9 to 1.1), and more preferably 1:(0.95 to 1.05).
(2) The mass ratio of a polyethylene glycol derivative I and a chelating agent for preparing a medical hydrogel using the kit is 1:(0.003 to 0.03), and preferably 1:(0.01 to 0.02).

In some embodiments, the kit further includes instructions for use, providing the following contents:
(1) preparing a solution A containing a polyethylene glycol derivative I and a chelating agent using component E and component G;
(2) preparing a solution B containing a polyethylene glycol derivative II using component F;
(3) mixing the solution A and the solution B to obtain a medical hydrogel.

In some more specific embodiment, the instructions for use include the following contents:
Preparing a solution A using a polyethylene glycol derivative I and tannic acid, and the mass concentration percentage of tannic acid in the solution A is 0.06% to 0.6% (m/v), preferably 0.1% to 0.5% (m/v), more preferably 0.2% to 0.4% (m/v), and further preferably 0.3% (m/v); the mass concentration percentage of the polyethylene glycol derivative I in the solution A is 10% to 25% (m/v), and preferably 18% to 22% (m/v).

In some more specific embodiment, the instructions for use include the following contents:
Preparing a solution B using a polyethylene glycol derivative II, and the mass concentration percentage of the polyethylene glycol derivative II in the solution B is 10% to 25% (m/v), and preferably 18% to 22% (m/v).

Uses of Medical Hydrogel

A fourth aspect of the present disclosure provides uses of a medical hydrogel. In some embodiments, the medical hydrogel is used as or to prepare a medical hydrogel for endoscopic sealing; in some embodiments, the medical hydrogel is used as or to prepare a medical hydrogel for blood vessel sealing; in some embodiments, the medical hydrogel is used as or to prepare a medical hydrogel for surgical sealing; in some embodiments, a medical hydrogel is used as or to prepare a medical hydrogel for sealing cerebrospinal fluid leakage.

The medical hydrogel of the present disclosure can achieve effective adhesion to tissues to quickly stop bleeding, effectively seal wounds, and promote healing of wound tissues, it has potentially huge application scenarios in fields of gastrointestinal surgery, hand and foot surgery, neurosurgery, etc.

EXAMPLES

The embodiments of the present disclosure will be described in detail below in connection with the examples, but persons skilled in the art will understand that the following examples are only used to illustrate the present disclosure and should not be regarded as limiting the scope of the present disclosure. Examples in which specific conditions are not indicated were carried out according to the conventional conditions or conditions suggested by the manufacturers. The reagents or instruments used without indication of the manufacturers are conventional products available from commercially.

Example 1

In this example, tannic acid, 4arm-PEG-$NH_2$ and 4arm-PEG-SS were used as raw materials to prepare a medical hydrogel, wherein 4arm-PEG-$NH_2$ has a structure shown in Formula (I) and a molecular weight of 10000; 4arm-PEG-SS has a structure shown in Formula (II) and a molecular weight of 10000.

The specific preparation steps of the medical hydrogel were as follows:
(1) 0.003 g of tannic acid and 0.2 g of 4arm-PEG-$NH_2$ were taken and mixed, and then dissolved in 1 mL of PBS buffer with a pH of 7.2 to 7.4 to obtain a solution A for later use, in which the mass concentration percentage of tannic acid was 0.3% (m/v), the mass concentration percentage of 4arm-PEG-$NH_2$ was 20% (m/v), (2) 0.2 g of 4arm-PEG-SS was dissolved into 1 mL of PBS buffer with a pH value of 7.2 to 7.4, and after completely dissolution, a solution B containing 20% (m/v) 4arm-PEG-SS was obtained, and stayed for later use.
(3) The aforesaid solution A and solution B were added into a dual syringe and injected into a mold simultaneously, to form a gel.

Example 2

In this example, tannic acid, 4arm-PEG-NH$_2$ and 4arm-PEG-SS were used as raw materials to prepare a medical hydrogel, wherein 4arm-PEG-NH$_2$ has a structure shown in Formula (I) and a molecular weight of 5000; 4arm-PEG-SS has a structure shown in Formula (II) and a molecular weight of 5000.

The specific preparation steps of the medical hydrogel were as follows:
(1) 0.003 g of tannic acid was dissolved in 1 mL of PBS buffer with a pH value of 7.2 to 7.4;
(2) 0.1 g of 4arm-PEG-NH$_2$ was dissolved in the tannic acid solution;
(3) the aforesaid two solutions were mixed to obtain a solution A for later use, in which the mass concentration percentage of tannic acid was 0.3% (m/v), the mass concentration percentage of 4arm-PEG-NH$_2$ was 10% (m/v);
(4) 0.1 g of 4arm-PEG-SS was dissolved into 1 mL of PBS buffer with a pH of 7.2 to 7.4, and after complete dissolution, a solution B containing 10% (m/v) 4arm-PEG-SS was obtained, and stayed for later use;
(5) The aforesaid solution A and solution B were added into a syringe and injected into a mold simultaneously, to form a gel.

Example 3

In this example, tannic acid, 4arm-PEG-NH$_2$ and 4arm-PEG-SS were used as raw materials to prepare a medical hydrogel, wherein 4arm-PEG-NH$_2$ has a structure shown in Formula (I) and a molecular weight of 20000; 4arm-PEG-SS has a structure shown in Formula (II) and a molecular weight of 20000.

The specific preparation steps of the medical hydrogel were as follows:
(1) 0.25 g of 4arm-PEG-NH$_2$ was dissolved in 1 mL of PBS buffer with a pH of 7.2 to 7.4. After 4arm-PEG-NH$_2$ was completely dissolved, a solution with a mass concentration percentage of 4arm-PEG-NH$_2$ of 10% (m/v) was obtained;
(2) 0.005 g of tannic acid was dissolved in the solution prepared in step (1), and after dissolution, a solution A with a mass concentration percentage of tannic acid of 0.5% (m/v) was obtained, and stayed for later use;
(3) 0.25 g of 4arm-PEG-SS was dissolved in 1 mL of PBS buffer with a pH of 7.2 to 7.4. After complete dissolution, a solution B of 25% (m/v) was obtained, and stayed for later use;
(4) The aforesaid solution A and solution B were added into a dual syringe and injected into a mold simultaneously, to form a gel.

Example 4

In this example, tannic acid, 4arm-PEG-NH$_2$ and 4arm-PEG-SS were used as raw materials to prepare a medical hydrogel, wherein 4arm-PEG-NH$_2$ has a structure shown in Formula (I) and a molecular weight of 15000; 4arm-PEG-SS has a structure shown in Formula (II) and a molecular weight of 15000.

The specific preparation steps of the medical hydrogel were as follows:
(1) 0.02 g of tannic acid and 2 g of 4arm-PEG-NH$_2$ were dissolved in 10 mL of PBS buffer with a pH of 7.2 to 7.4, and after tannic acid and 4arm-PEG-NH$_2$ were completely dissolved, a solution A was obtained for later use, in which the mass concentration percentage of tannic acid was 0.2% (m/v), and the mass concentration percentage of 4arm-PEG-NH$_2$ was 20% (m/v).
(2) 2 g of 4arm-PEG-SS was dissolved into 10 mL of PBS buffer with a pH value of 7.2 to 7.4, and after completely dissolution, a solution B containing 20% (m/v) 4arm-PEG-SS was obtained, for use.
(3) The aforesaid solution A and solution B were added into a dual syringe and injected into a mold simultaneously, to form a gel.

Comparative Example 1

In this comparative example, 4arm-PEG-NH$_2$ and 4arm-PEG-SS were used as raw materials to prepare a medical hydrogel, wherein 4arm-PEG-NH$_2$ has a structure shown in Formula (I) and a molecular weight of 10000; 4arm-PEG-SS has a structure shown in Formula (II) and a molecular weight of 10000.

The specific preparation steps of the medical hydrogel were as follows:
(1) 0.2 g of 4arm-PEG-NH$_2$ was dissolved in 1 mL of PBS buffer with a pH of 7.2 to 7.4, and after dissolution, a solution of 4arm-PEG-NH$_2$ having a mass concentration percentage of 20% (m/v) was obtained, and stayed for later use.
(2) 0.2 g of 4arm-PEG-SS was dissolved into 1 mL of PBS buffer with a pH value of 7.2 to 7.4, and after dissolution, a solution of 4arm-PEG-SS having a mass concentration percentage of 20% (m/v) was obtained, and stayed for later use.
(3) The aforesaid solution of 4arm-PEG-NH$_2$ and solution of 4arm-PEG-SS were added into a dual syringe and injected into a mold simultaneously, to form a gel.

Performance Testing

The medical hydrogels prepared with different mass concentration percentage of tannic acid in Examples 1 to 4 and Comparative Example 1 were tested as follows.

1. SEM Analysis

After the medical hydrogels were lyophilized, they were subjected to sputter coating, followed by scanning electron microscopy analysis.

FIG. 1 shows SEM images of medical hydrogels with the variation of the content of tannic acid in different solution A, all of which exhibit porous morphologies, wherein, the molecular weights of 4arm-PEG-NH$_2$ and 4arm-PEG-SS were both 20000. The mass concentration percentage of 4arm-PEG-NH$_2$ was 20% (m/v); the mass concentration percentage of 4arm-PEG-SS was 20% (m/v). And, "a" indicates that the mass concentration percentage of tannic acid was 0% (m/v), "b" indicates that the mass concentration percentage of tannic acid was 0.1% (m/v), "c" indicates that the mass concentration percentage of tannic acid was 0.3% (m/v), "d" indicates that the mass concentration percentage of tannic acid was 0.5% (m/v), and "e" indicates that the mass concentration percentage of tannic acid was 1% (m/v) (the meanings of "a", "b", "c", "d" and "e" in all the drawings are the same).

2. Gel Formation Time

Timing began as soon as the medical hydrogel was injected out of a dual syringe. After about 0.6 mL of the medical hydrogel liquid was injected in a vial, the vial was shaken from side to side to observe whether the injected medical hydrogel flowed with the shaking, and the duration time was recorded when the injected medical hydrogel did not flow, and was taken as the gel formation time.

Figure 2:
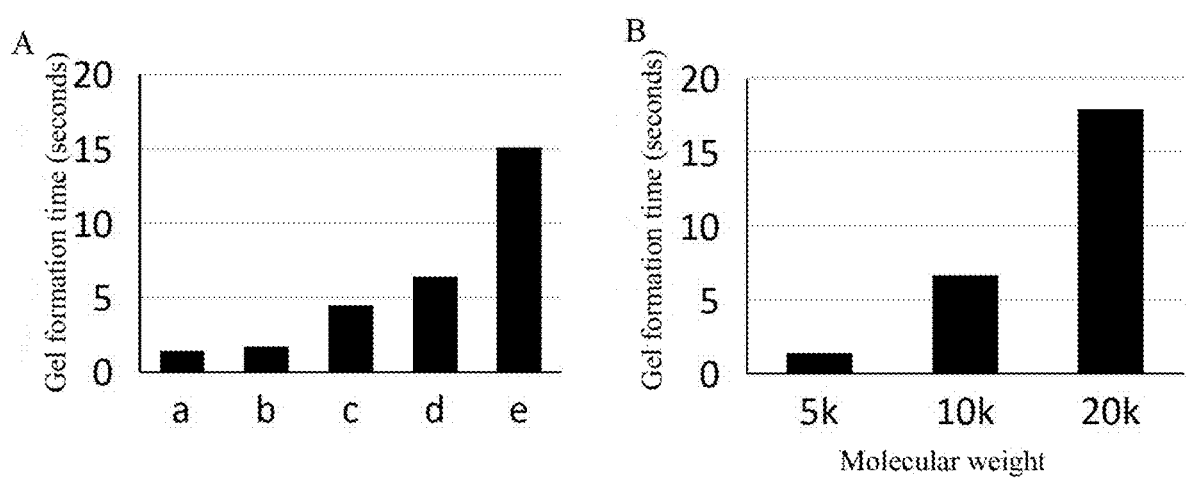
FIG. 2 shows the results of the effects of the content of tannic acid and molecular weights of PEG derivatives on the gel formation time of medical hydrogels. FIG. A in FIG. 2 is the data of gel formation time of medical hydrogels prepared with different content of tannic acid, and FIG. B in FIG. 2 is the data of gel formation time of medical hydrogels prepared with 4arm-PEG-SS and 4arm-PEG-NH$_2$ having different molecular weights. In FIG. A, "a" to "e" sequentially indicate that the mass concentration percentage of tannic acid in solution A is 0% (m/v), 0.1% (m/v), 0.3% (m/v), 0.5% (m/v), and 1% (m/v), respectively.

FIG. 2 shows effects of the content of tannic acid and the molecular weights of the PEG derivatives on the gel formation time of medical hydrogels. FIG. A in FIG. 2 is the data of gel formation time of medical hydrogels prepared with different content of tannic acid, and FIG. B in FIG. 2 is the data of gel formation time of medical hydrogels prepared with 4arm-PEG-SS and 4arm-PEG-NH$_2$ having different molecular weights, wherein 4arm-PEG-SS and 4arm-PEG-NH$_2$ used to prepare the same medical hydrogel has the same molecular weight.

From FIG. 2, it can be seen that after the addition of tannic acid, the gel formation time of the medical hydrogels increased significantly, from 1.4 s at 0% (m/v) of the mass concentration percentage of tannic acid to 15.1 s at 1% (m/v) of the mass concentration percentage of tannic acid, indicating that the addition of tannic acid played a certain role in the reaction of the two PEG components. The right figure shows that the gel formation time increased with the increase of the molecular weights of 4arm-PEG-SS and 4arm-PEG-NH$_2$.

3. Swelling Rate

The prepared medical hydrogel (10 mm in diameter, 5 mm in height) was put into a refrigerator (−20° C.) to freeze overnight, after which the medical hydrogel was lyophilized for 40 h, and then taken out and weighed ($W_0$). After the weighing, the medical hydrogel was placed in a 50 mL centrifuge tube containing 45 mL of PBS and placed in a 37° C. water bath for swelling test. The medical hydrogel was taken out at time points (0.5 h, 1 h, 2 h, 4 h, 8 h, 16 h, 24 h, 48 h, 72 h) and placed on a filter paper to absorb water, and followed by weighing ($W_1$). Swelling rate=($W_1$−$W_0$)/$W_0$×100%.

Figure 3:
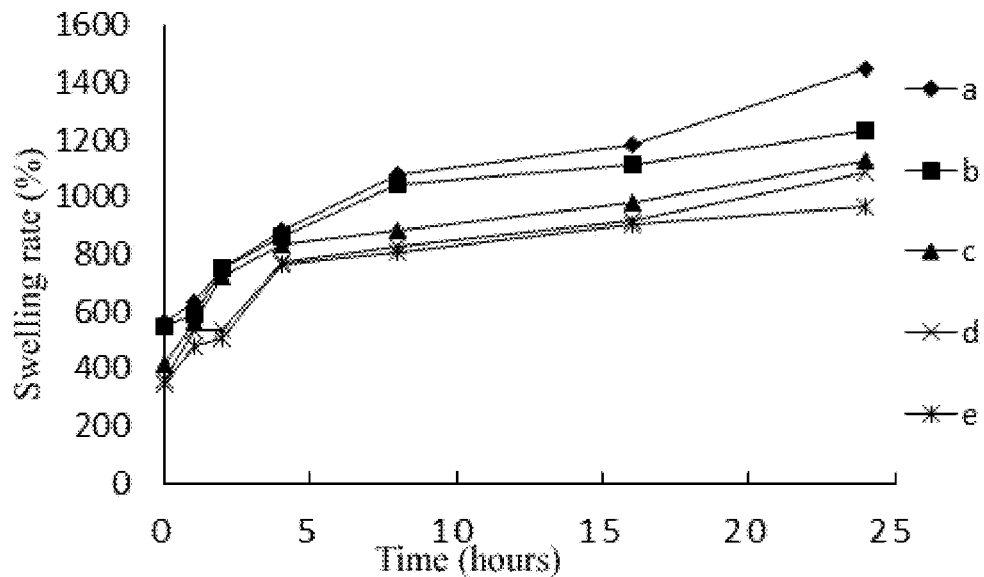
FIG. 3 shows the results of the effects of the content of tannic acid on gel formation time of medical hydrogels.

FIG. 3 shows effect of the content of tannic acid on the gel formation time of medical hydrogels. From FIG. 3, it can be seen that the swelling rate within 24 hours gradually decreased with the increase of the content of tannic acid, indicating that tannic acid was effectively embedded into the molecular chains of the two PEG components and played a certain role in restraining swelling. The date of swelling rate test is shown in the table below.

TABLE 1

Data of swelling rate test

| Time/days | Swelling rate/% | | | | |
|---|---|---|---|---|---|
| | a | b | c | d | e |
| 0.5 | 565.44 | 551.32 | 416.35 | 359.40 | 348.38 |
| 1 | 630.59 | 589.84 | 562.42 | 536.00 | 479.06 |
| 2 | 752.74 | 751.71 | 719.49 | 532.92 | 509.35 |
| 4 | 885.96 | 864.16 | 831.04 | 771.02 | 767.82 |
| 8 | 1076.05 | 1045.24 | 881.12 | 828.43 | 809.57 |
| 16 | 1182.57 | 1112.52 | 982.69 | 915.59 | 905.89 |
| 24 | 1447.13 | 1234.79 | 1127.75 | 1086.71 | 969.24 |

4. Degradation Rate

The prepared medical hydrogel (10 mm in diameter, 5 mm in height) was put into a refrigerator (−20° C.) to freeze overnight, after which the medical hydrogel was lyophilized in a lyophilizer for 40 h, and then taken out and weighed ($W_0$). After weighing and recording, the medical hydrogel was placed in a 50 mL centrifuge tube containing 45 mL of PBS for degradation test in a 37° C. water bath. At time points (1 d, 2 d, 3 d, 4 d), the medical hydrogel was taken out and placed in the refrigerator (−20° C.) for overnight freezing and then lyophilized (40 h). After lyophilizing, the medical hydrogel was weighed ($W_1$) to calculate the degradation rate. Degradation rate=($W_0$−$W_1$)/$W_0$×100%.

Figure 4:
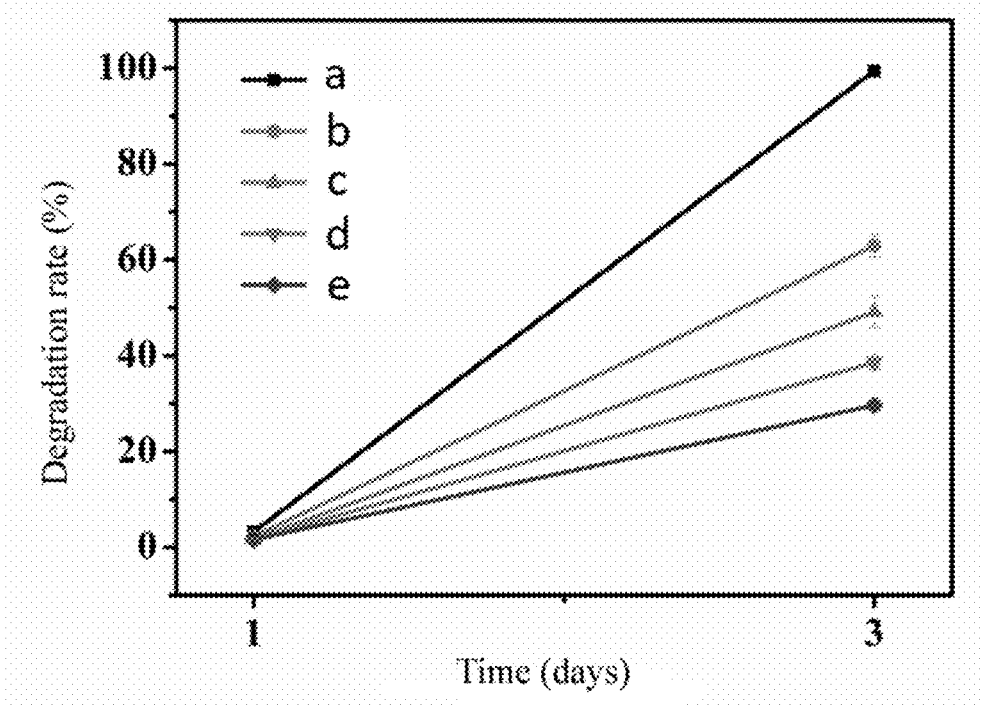
FIG. 4 shows the results of the effects of different content of tannic acid on the degradation rate of medical hydrogels.

FIG. 4 shows effect of different content of tannic acid on the degradation rate of medical hydrogels. From FIG. 4, it can be seen that with the increase of the content of tannic acid, the degradation of the medical hydrogel in 72 hours gradually slowed down. When the mass concentration percentage of tannic acid was 0% (m/v), the medical hydrogel was almost completely degraded, while the degradation rate was less than 30% when the mass concentration percentage of tannic acid was 1% (m/v), indicating that the addition of tannic acid effectively slowed down the degradation time of medical hydrogel.

5. Rheology Test

The rheology testing was carried out according to a Discovery series rheometer from TA Instruments.

Figure 5:
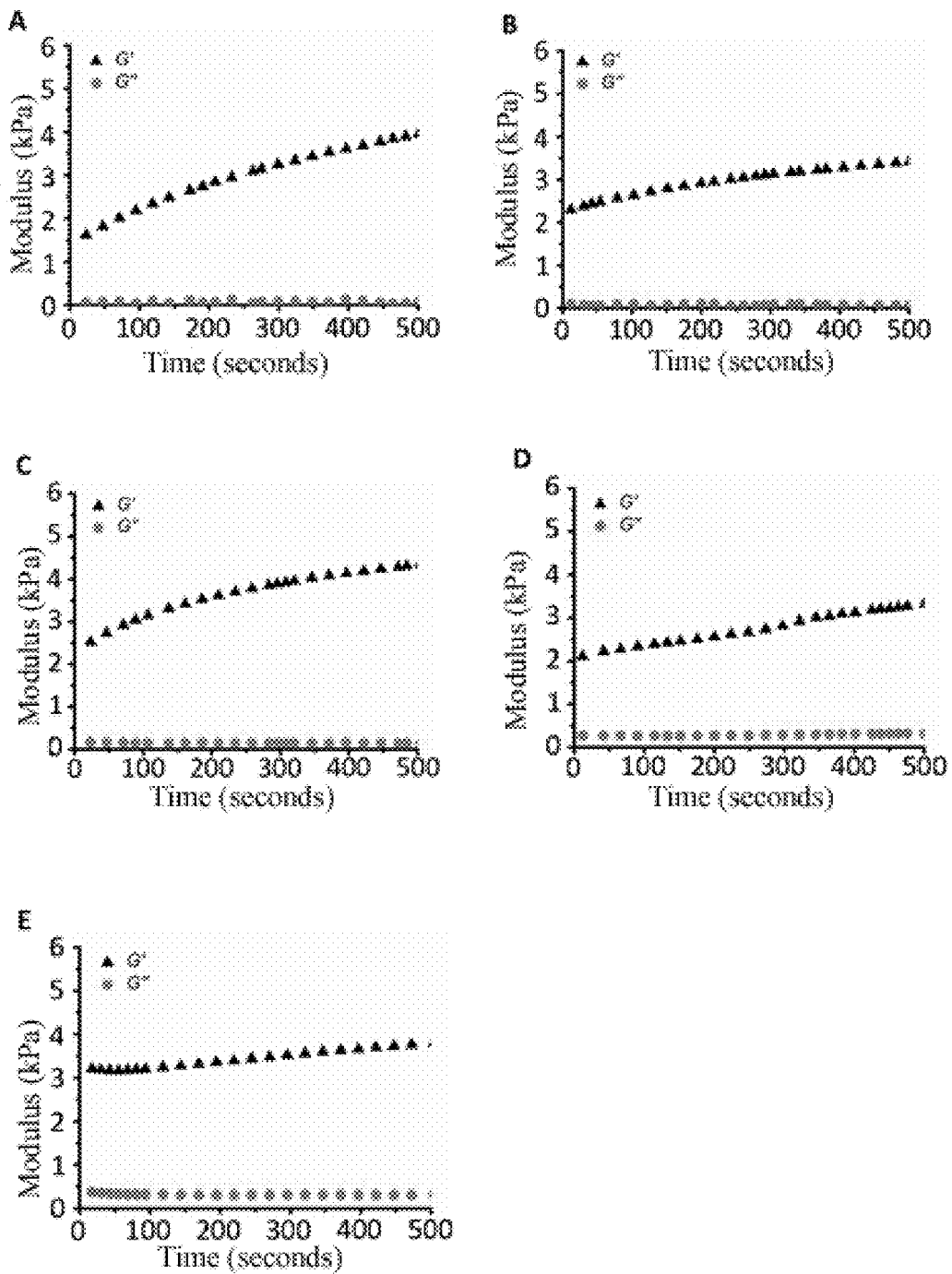
FIG. 5 shows the variation pattern of the storage modulus of medical hydrogels prepared with different content of tannic acid over scanning time. FIG. A in FIG. 5 corresponds to tannic acid with a mass concentration percentage of 0% (m/v) in solution A, FIG. B in FIG. 5 corresponds to tannic acid with a mass concentration percentage of 0.1% (m/v) in solution A, FIG. C in FIG. 5 corresponds to tannic acid with a mass concentration percentage of 0.3% (m/v) in solution A, FIG. D in FIG. 5 corresponds to tannic acid with a mass concentration percentage of 0.5% (m/v) in solution A, and FIG. E in FIG. 5 corresponds to tannic acid with a mass concentration percentage of 1% (m/v) in solution A.
Figure 6:
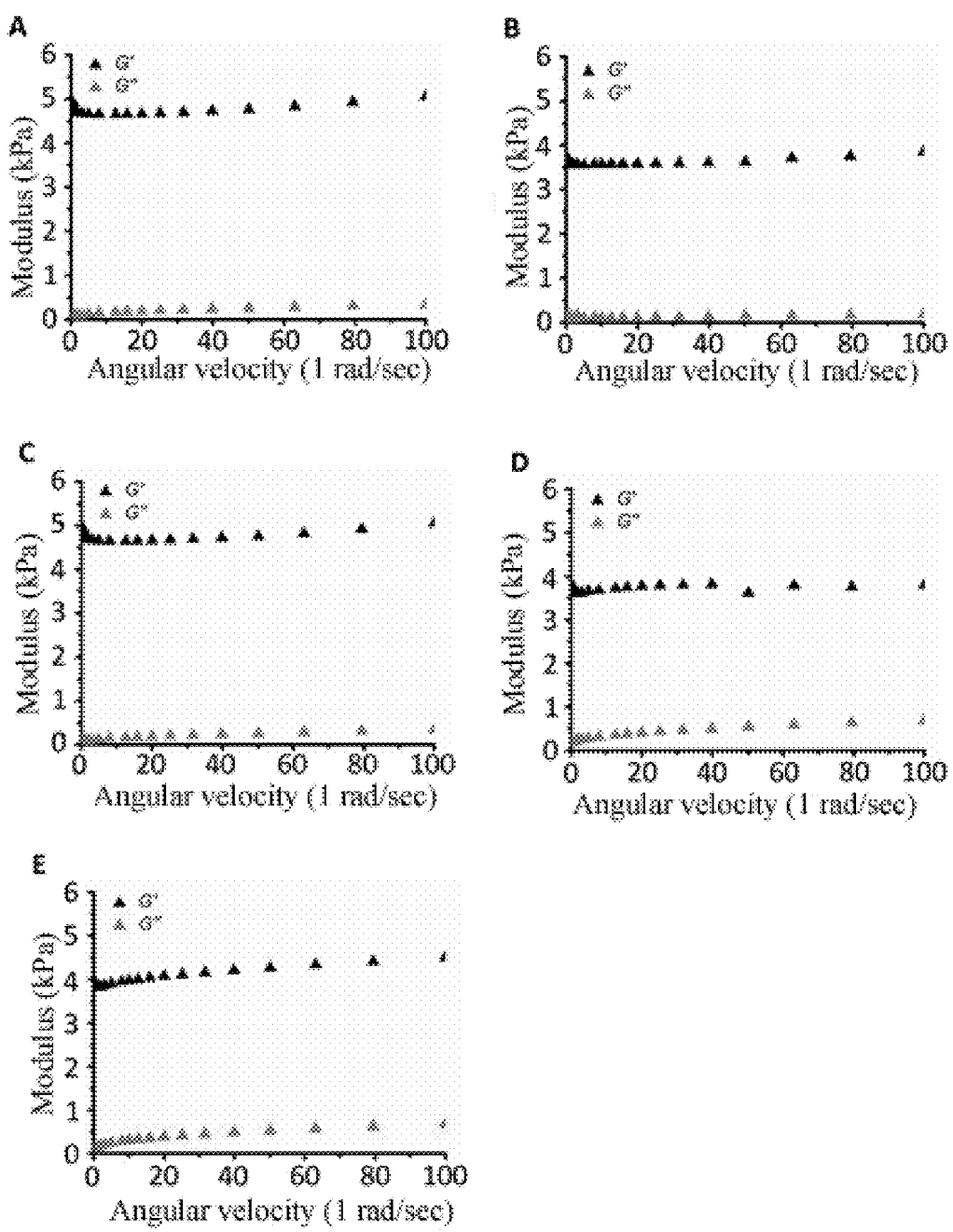
FIG. 6 shows the variation pattern of the storage modulus of medical hydrogels prepared with different content of tannic acid over scanning frequency. FIG. A in FIG. 6 corresponds to tannic acid with a mass concentration percentage of 0% (m/v) in solution A, FIG. B in FIG. 6 corresponds to tannic acid with a mass concentration percentage of 0.1% (m/v) in solution A, FIG. C in FIG. 6 corresponds to tannic acid with a mass concentration percentage of 0.3% (m/v) in solution A, FIG. D in FIG. 6 corresponds to tannic acid with a mass concentration percentage of 0.5% (m/v) in solution A, FIG. E in FIG. 6 corresponds to tannic acid with a mass concentration percentage of 1% (m/v) in solution A.

FIG. 5 and FIG. 6 show effects of the content of tannic acid on the stability of medical hydrogels. FIG. 5 shows the variation pattern of the storage modulus of medical hydrogels prepared with different content of tannic acid over scanning time. FIG. 6 shows the variation pattern of the storage modulus of medical hydrogels prepared with different content of tannic acid over scanning frequency. FIG. A in FIG. 5 and FIG. A in FIG. 6 correspond to 0% (m/v) tannic acid, FIG. B in FIG. 5 and FIG. B in FIG. 6 correspond to 0.1% (m/v) tannic acid, FIG. C in FIG. 5 and FIG. C in FIG. 6 correspond to 0.3% (m/v) tannic acid, FIG. D in FIG. 5 and FIG. D in FIG. 6 correspond to 0.5% (m/v) tannic acid, and FIG. E in FIG. 5 and FIG. E in FIG. 6 correspond to 1% (m/v) tannic acid.

According to FIG. 5 and FIG. 6, over the scanning time, the variation of storage modulus over the time tends to be smooth with the increase of tannic acid content, indicating that tannic acid enhanced the stability of the medical hydrogels.

6. Burst Test

A syringe pump, a rubber tube, a glass T-branch, a hydraulic gauge, and a pig heart tube were connected and confirmed sealed. Then, a 2 mm aperture was made on the pig heart tube, followed by injecting the medical hydrogel onto the aperture. After gelation for 5 minutes, the syringe pump was turned on to carry out the burst test. When the reading of the pressure gauge dropped, the highest value before the drop was recorded as the burst strength.

Figure 7:
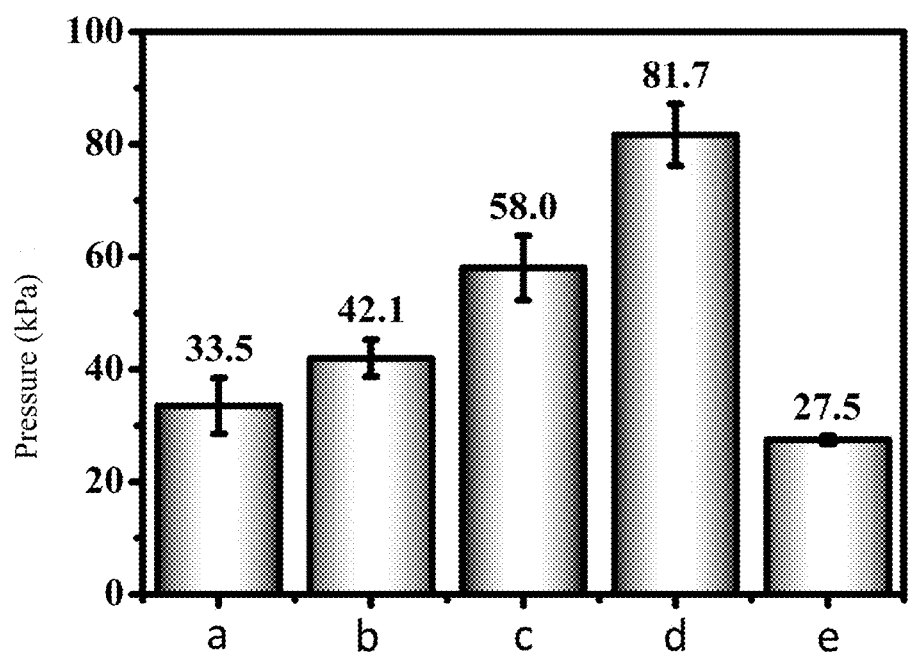
FIG. 7 shows test results of the burst strength of medical hydrogels with different content of tannic acid.

FIG. 7 shows test results of the burst strength of medical hydrogels with different mass concentration percentages of tannic acid. According to FIG. 7, the burst strength of the medical hydrogels gradually increased with the increase of the mass concentration percentage of tannic acid from 0% (m/v) to 0.5% (m/v), while when the mass concentration percentage of tannic acid was 1% (m/v), the burst strength decreased significantly, which might be caused by the uneven dispersion of tannic acid.

7. Mechanical Strength 7.1 Adhesion Test

Pig skin (or a patch) was cut into 2 strips of 7.5 cm×2 cm, and one PEG solution (100 μl) was injected into an area of 2 cm×2 cm at the front of one of the strips, and another PEG solution (100 μl) was injected into the other strip in the same way. Then, the areas of 2 cm×2 cm at the front of the two strips of the pig skin were adhered together and placed in a 50 mL centrifuge tube filled with 45 mL of PBS, and placed in a 37° C. water bath. Five parallel samples of each test were taken out at each time point (0 d, 1 d, 3 d, 5 d) and the force was measured using a tensile tester. Adhesion strength=force/area. The area was 4 cm².

7.2 Pressure Test

The medical hydrogel was injected into a polytetrafluoroethylene plate (10 mm in diameter, 5 mm in height), and then the medical hydrogel was placed in a universal tensile tester for pressure testing. There were 5 parallel samples in each test. The compression rate was 5 mm/min. Pressure=force/area.

Figure 8:
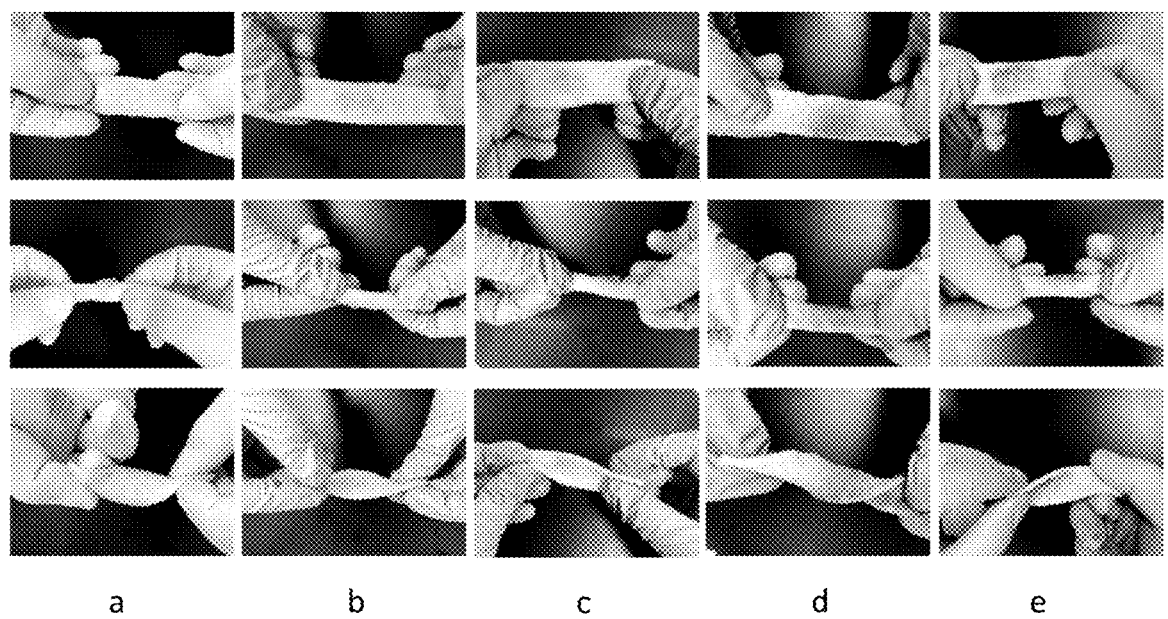
FIG. 8 shows test results of the mechanical strength of medical hydrogels with different content of tannic acid, specifically the data of torsion test conducted with pigskin.
Figure 9:
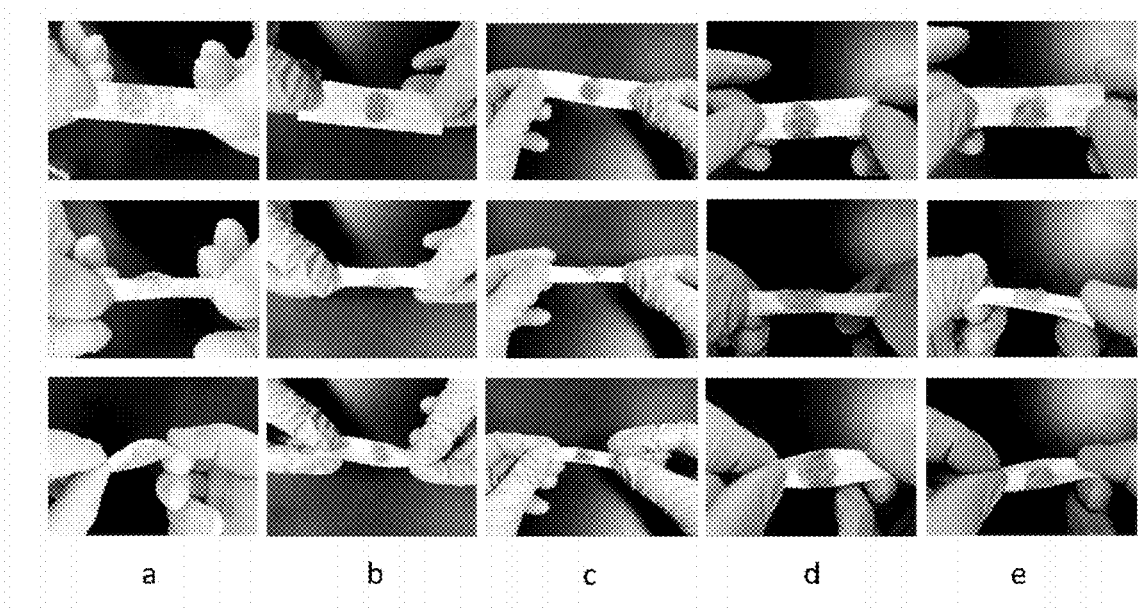
FIG. 9 shows test results of the mechanical strength of medical hydrogels with different content of tannic acid, specifically the data of torsion test conducted with SIS patch.

FIG. 8 and FIG. 9 show test results of the mechanical strength of medical hydrogels with different content of tannic acid, wherein FIG. 8 shows a torsion test performed with pigskin, and FIG. 9 shows a torsion test performed with an SIS patch. From FIG. 8 and FIG. 9, it can be seen that the medical hydrogels with all content of tannic acid had good compatibility and matched mechanical strength with pigskin, and that the medical hydrogels with all content of tannic acid had good compatibility and matched mechanical strength with the SIS patch.

8. Bacteriostatic Test

A medical hydrogel was subjected to extraction of the extract solution in PBS buffer. After 24 hours, a filter paper with a diameter of 1 cm was put into the extract solution with different content of tannic acid. After half an hour, the filter paper was taken out and placed in agar solid medium containing 107 bacterial suspensions, and incubated in a 37° C. incubator for 24 h. The size of the inhibition zone was monitored.

Figure 10:
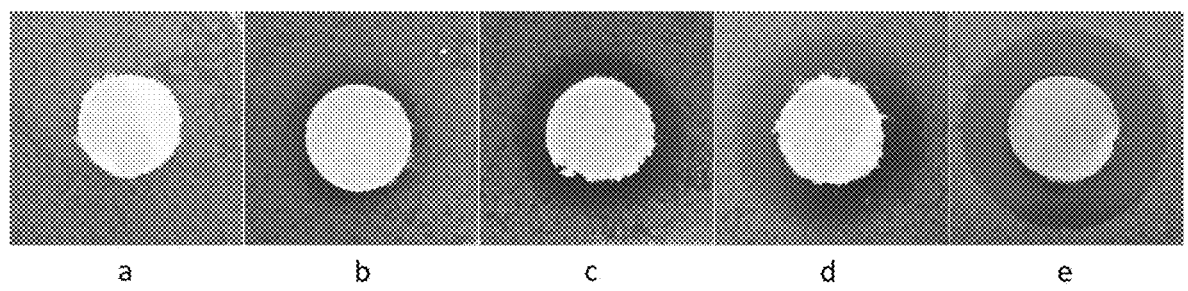
FIG. 10 shows bacteriostatic effects of medical hydrogels prepared with different content of tannic acid.

FIG. 10 shows bacteriostatic effects of medical hydrogels prepared with different content of tannic acid. According to FIG. 10, the medical hydrogel prepared from the solution A with 0% content of tannic acid did not have a bacteriostatic effect; the medical hydrogel prepared from the solution A with 0.1% content of tannic acid had a small inhibition zone, indicating that it had a certain degree of bacteriostatic effect; while the medical hydrogels prepared from solution A with the content of tannic acid of 0.3%, 0.5% and 1% all had obvious inhibition zones, indicating a good bacteriostatic effect, and the bacteriostatic effect was more obvious with the increase of the content of tannic acid.

The above-mentioned embodiments of the present disclosure are only examples for clearly illustrating the present disclosure but not limitation to the embodiments of the present disclosure. For persons of ordinary skill in the art, variations or modifications in other different forms can also be made on the basis of the above description. It is unnecessary and impossible to exhaust all implementations herein. Any modifications, equivalent replacements and improvements made within the spirit and principle of the present disclosure shall be included within the protection scope of the claims of the present disclosure.

What is claimed is:

1. A medical hydrogel comprising a hydrogel skeleton and a chelating agent chelated to the hydrogel skeleton;
the hydrogel skeleton is formed by the bonding of a polyethylene glycol derivative I and a polyethylene glycol derivative II, the structure of the polyethylene glycol derivative I is shown in Formula (I):

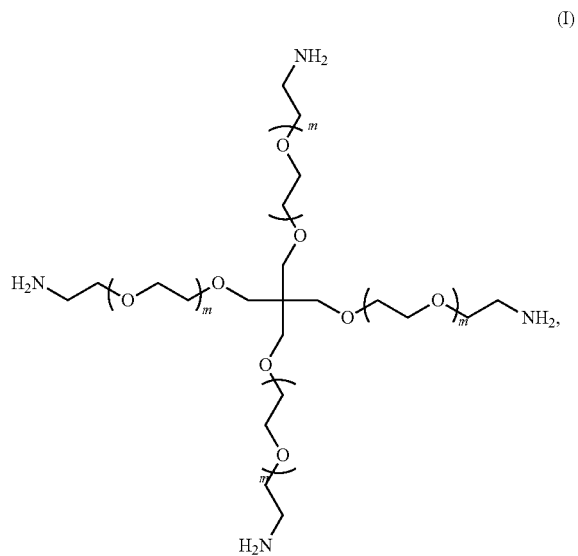

the structure of the polyethylene glycol derivative II is shown in Formula (II):

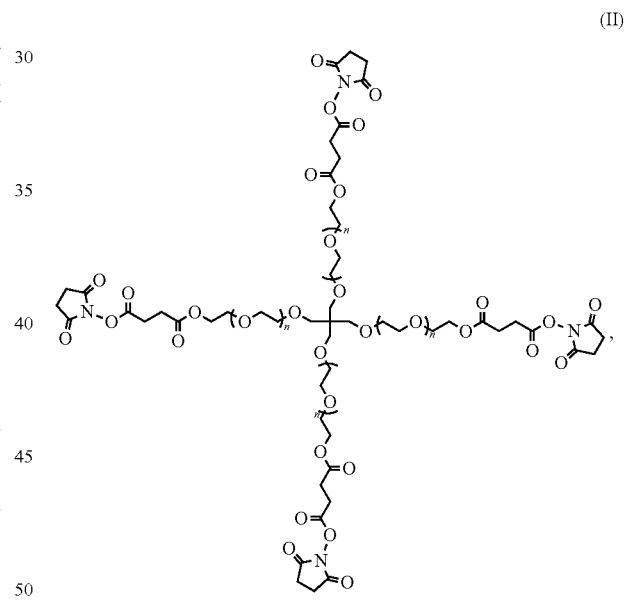

wherein, m and n are natural numbers; the molecular weight of the polyethylene glycol derivative I is 2000 to 20000; the molecular weight of the polyethylene glycol derivative II is 2000 to 20000;

the chelating agent is selected from tannic acid and/or citric acid.

2. The medical hydrogel according to claim 1, wherein the mass ratio of the polyethylene glycol derivative I and the polyethylene glycol derivative II is 1:(0.8 to 1.2).

3. The medical hydrogel according to claim 1, wherein the mass ratio of the polyethylene glycol derivative I and the chelating agent is 1:(0.003 to 0.03).

4. The medical hydrogel according to claim 1, wherein the chelating agent is tannic acid.

5. A preparation method of the medical hydrogel according to claim 1, comprising steps of:
preparing a solution A containing a polyethylene glycol derivative I and a chelating agent;
preparing a solution B containing a polyethylene glycol derivative II;
mixing the solution A and the solution B to obtain a medical hydrogel.

6. The preparation method according to claim 5, wherein the step of preparing the solution A containing a polyethylene glycol derivative I and a chelating agent comprises:
preparing a solution containing a polyethylene glycol derivative I and a solution containing a chelating agent, respectively, and mixing the two solutions to obtain the solution A; or
preparing a solution containing a polyethylene glycol derivative I, and adding a chelating agent to the solution containing the polyethylene glycol derivative I to obtain the solution A; or
preparing a solution containing a chelating agent, and adding a polyethylene glycol derivative I to the solution containing the chelating agent to obtain the solution A; or
mixing a polyethylene glycol derivative I and a chelating agent and adding the mixture to a solvent to obtain the solution A.

7. The preparation method according to claim 5, wherein the chelating agent is tannic acid.

8. The preparation method according to claim 5, wherein the mass concentration percentage of the polyethylene glycol derivative I in the solution A is 10% to 25% (m/v).

9. The preparation method according to claim 5, wherein the mass concentration percentage of the polyethylene glycol derivative II in the solution B is 10% to 25% (m/v).

10. A method for preparing a medical hydrogel:
for endoscopic sealing which comprises utilizing the medical hydrogel according to claim 1.

11. A kit for preparing a medical hydrogel, the kit comprising:
a component E, comprising a polyethylene glycol derivative I having a structure shown in Formula (I):

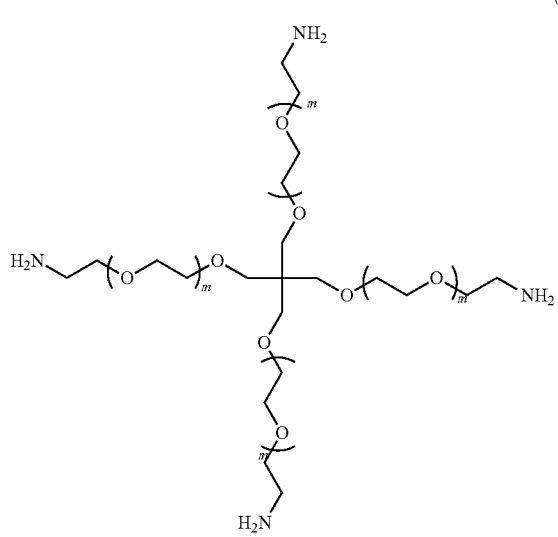

(I)

a component F, comprising a polyethylene glycol derivative II having a structure shown in Formula (II):

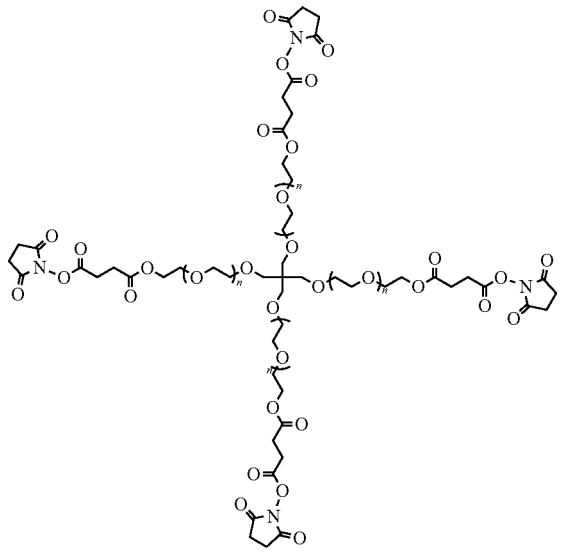

(II)

and, a component G, comprising a chelating agent;
wherein, m and n are natural numbers; the molecular weight of the polyethylene glycol derivative I is 2000 to 20000; the molecular weight of the polyethylene glycol derivative II is 2000 to 20000;
the chelating agent is selected from tannic acid and/or citric acid.

12. A medical hydrogel according to claim 1, wherein the molecular weight of the polyethylene glycol derivative I is 5000 to 15000, the molecular weight of the polyethylene glycol derivative II is 5000 to 15000.

13. The medical hydrogel according to claim 1, wherein the mass ratio of the polyethylene glycol derivative I and the polyethylene glycol derivative II is 1:(0.9 to 1.1).

14. The medical hydrogel according to claim 1, wherein the mass ratio of the polyethylene glycol derivative I and the chelating agent is 1:(0.01 to 0.02).

15. The preparation method according to claim 7, wherein the mass concentration percentage of tannic acid in the solution A is 0.06% to 0.6% (m/v).

16. The preparation method according to claim 8, wherein the mass concentration percentage of the polyethylene glycol derivative I in the solution A is 18% to 22% (m/v).

17. The preparation method according to claim 9, wherein the mass concentration percentage of the polyethylene glycol derivative II in the solution B is 18% to 22% (m/v).

18. A method for preparing a medical hydrogel for blood vessel sealing which comprises utilizing the medical hydrogel according to claim 1.

19. A method for preparing a medical hydrogel for surgical sealing which comprises utilizing the medical hydrogel according to claim 1.

20. A method for preparing a medical hydrogel for sealing cerebrospinal fluid leakage which comprises utilizing the medical hydrogel according to claim 1.

* * * * *